United States Patent Office 3,429,206
Patented Feb. 25, 1969

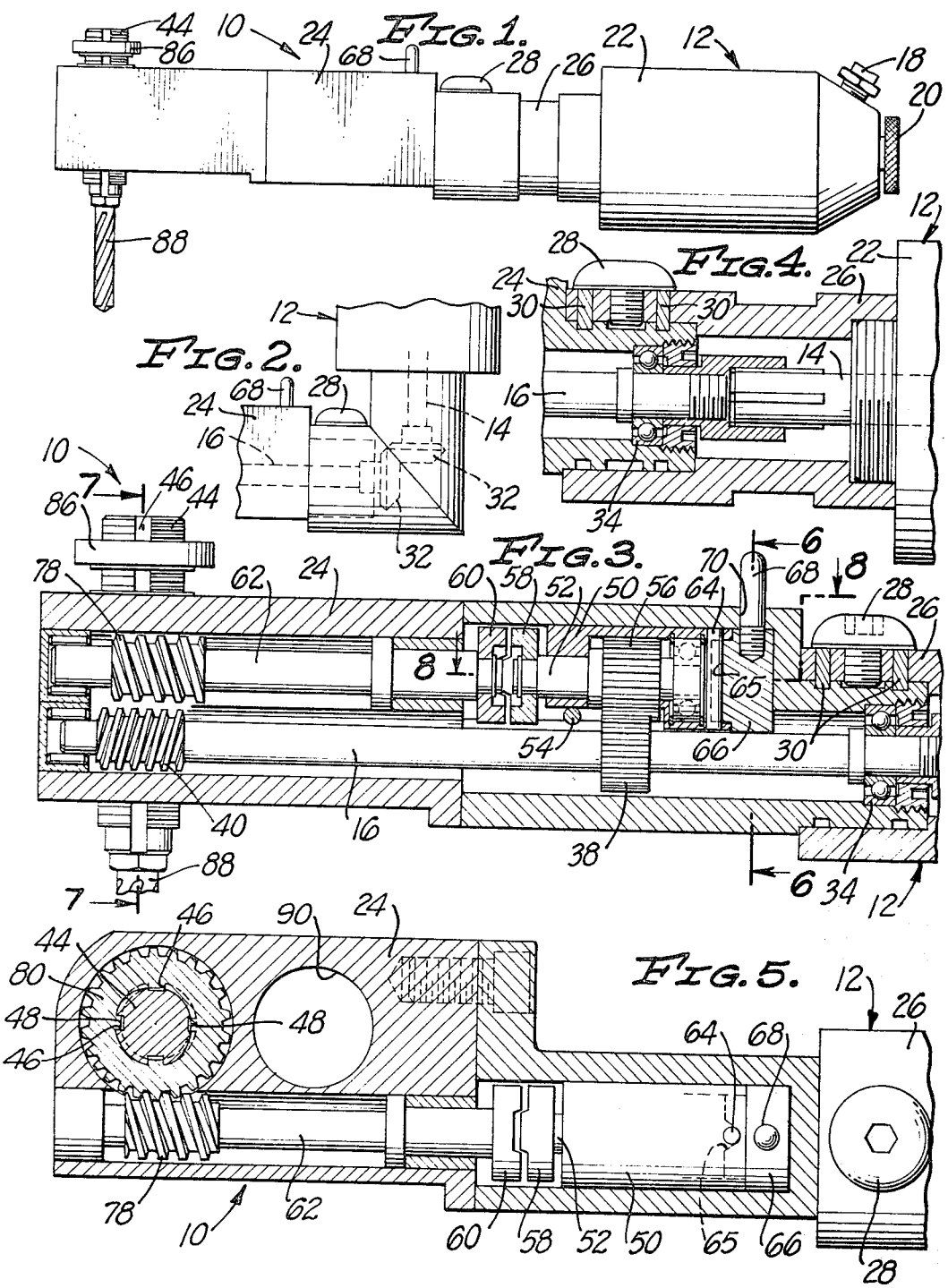

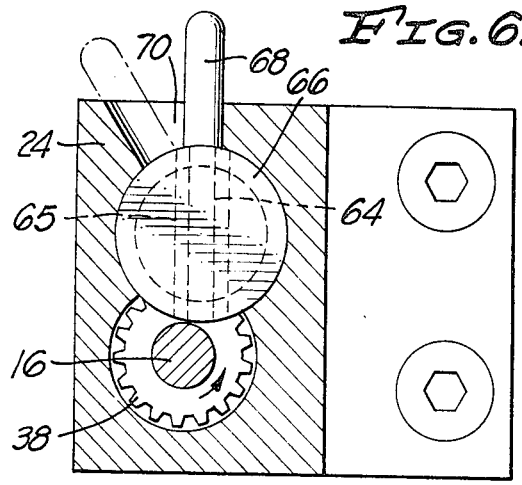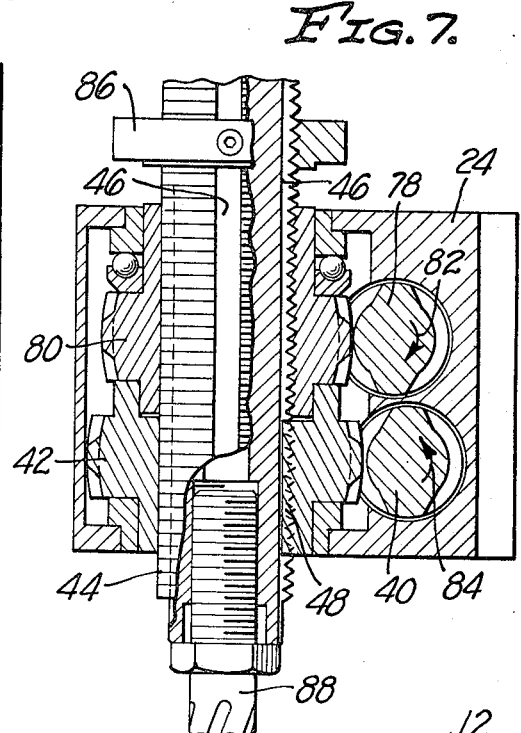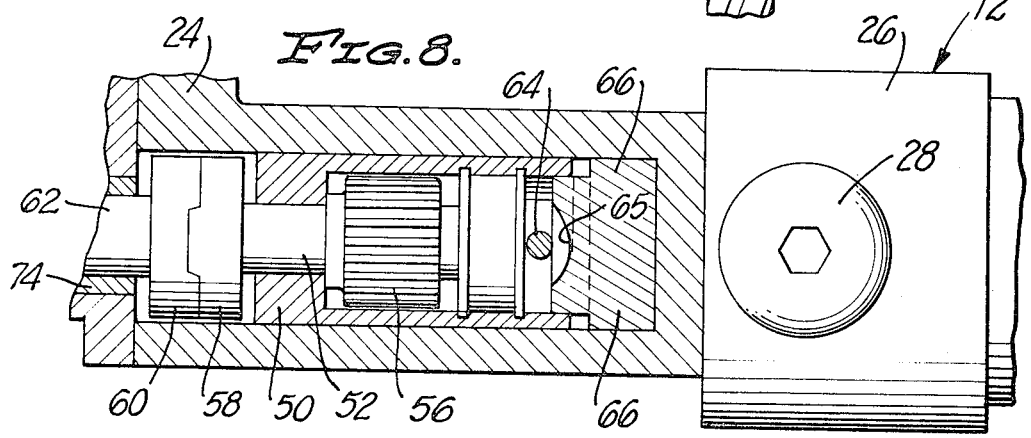

3,429,206
RIGHT ANGLE POSITIVE FEED DEVICE
Robert C. Quackenbush, Glendale, Calif., assignor of one-half to Arthur B. Quackenbush, Glendale, Calif.
Filed Aug. 8, 1966, Ser. No. 571,068
U.S. Cl. 77—34.7            13 Claims
Int. Cl. B23b 47/24, 47/04

ABSTRACT OF THE DISCLOSURE

A housing has parallel main device and feed shafts rotatable by an air drive motor. A unitary feed screw and spindle having the axis thereof at right angle to the shafts is rotatable in a single direction and is axially movable in feed and retraction strokes. The main drive shaft is worm and worm wheel connected for constantly driving the feed screw and spindle, while the feed shaft is connected between the main drive shaft and the feed screw portion of the feed screw and spindle through a clutch, a worm and a worm wheel feed nut on said feed screw portion. Clutch engagement rotates the feed nut faster than the feed screw and spindle driving the same axially in the feed stroke, and clutch disengagement stops the feed nut driving the feed screw and spindle in the retraction stroke. The clutch is operated manually and a stop collar can be set to jam the feed screw and spindle to stall the air drive motor at the end of the feed stroke.

---

This invention relates to a right angle positive feed device and, more particularly, to a right angle positive feed device which may be adapted for use in simultaneously rotating and feeding various work tools, such as drills and the like. Furthermore, the feed device of the present invention may be adapted for automatically retracting the work tool once the desired feeding stroke has been accomplished, or may be adapted for manual reversal of the feeding stroke.

Although the present invention and the technical principles thereof are hereinafter discussed, described and illustrated adapted for use with drills, it should be understood that the principles of the present invention are equally adaptable to use with various other types of work tools and other devices, and all such uses and adaptations are fully contemplated within the scope of the present invention.

Many prior forms of feed devices have been provided for use with drills and other work tools and many of these prior forms are still in use. Due to the stringent requirements of modern industry manufacturing, most of these prior forms of feed devices are completely unsatisfactory.

For instance, in modern industry manufacturing it is necessary to drill holes with maximum speed while maintaining relatively close maximum tolerances for the drilled holes. Also, it is necessary that the speed of the feed device be easily adjustable within relatively wide speed ranges so that various forms of materials may be accommodated. Still further, it is necessary that the feed device have sufficient torque and horsepower in order to drill relatively large holes in or through relatively thick material.

It is, therefore, an object of my invention to provide a feed device for drills of the positive feed type wherein the drill is advanced to the work for the drilling operation and when such operation is complete, said advancing may be either automatically or manually stopped, and then retracted at a relatively rapid speed. The positive feed is provided and a direct correlation between the feed and rotation of the tool maintained by interconnecting the rotation and feed through gearing taken from the same power source. The automatic or manual stopping of the advance is provided by automatically or manually regulating the portion of the gearing providing the feed relative to the rotation of the feed screw.

It is a further object of my invention to provide a feed device of the foregoing type in which the spindle for mounting and rotating the tool and the lead screw for advancing the tool to, into and from the work are formed as a single unit but acting in a dual function. The combined spindle and screw is telescoped by axially adjacent drive and feed gears, such as worm wheels, the drive gear rotatably driving the unitized spindle and screw while permitting relative axial movement thereof, and the feed gear threadably engaging the unitized spindle and screw so that relative rotation therebetween will advance or retract the spindle and screw, dependent on the direction of relative rotation. The drive for rotating each of the drive and feed gear, although necessarily driving the same at different speeds, is from the same source.

Another object of my invention to provide a feed device of the foregoing type which may be constructed for feeding the drill or tool at right angles to the main portion of the mechanism, whereby the device may be suspended extending generally horizontally over the work as opposed to most prior devices which necessarily extend generally vertically above the work. This form of the construction provides for greater ease in adjustment of the device for locating the particular area of the work in which the hole is to be drilled or otherwise worked upon and, at the same time, requires less cumbersome and space occupying structure for supporting the feed device above the work.

It is still a further object of my invention to provide a feed device having a direct correlation between the speed of rotation of the drill or other tool and the axial speed of advance of the tool into the work whereby it is possible by precalculation to establish any desired relationship between the rotation and speed of advance or feed so that the feed device may be easily adapted for any particular work conditions. For instance, if it is desired to provide the device with relatively slow tool rotation and advance with high speed retraction, this is possible merely by appropriately precalculating the feed screw pitch and that portion of the gearing involved with advance and retraction. At the same time, the speed relationship between advance and retraction may also be varied to the desired rates by similar precalculation.

It is an additional object of my invention to provide a feed device of the positive feed type as hereinbefore discussed in which the positive feed and retraction are controlled by simple clutch means wherein engagement and disengagement of the clutch means may be simply controlled merely by manually shifting mating clutch plates axially into engagement or disengagement. The clutch plates are merely shifted between engagement and disengagement by a hand shift lever and a stop collar may be preset on the feed screw for automatically stopping the tool rotation and advance or feed into the work until the clutch plates have been manually shifted between the engaged and disengaged positions for changing from feed to retraction.

It is still a further object of my invention to provide a feed device of the foregoing type in which the rotation of the tool and the feed and retraction of the tool are all accomplished through direct gearing and positive clutch coupling to the power source so that the device may be constructed for transmitting virtually any horsepower and torque within reasonable limits and to any usual type of tool, such as a drill, mounted therein.

Other objects and advantages of the invention will be apparent from the following specification and the accompanying drawings, which are for the purposes of illustration only, and in which:

FIG. 1 is a side elevational view of an embodiment of the feed device of the invention and showing a drill mounted in the feed screw or spindle thereof for rotation, feed and retraction;

FIG. 2 is a fragmentary, side elevational view showing an alternate arrangement of the drive motor;

FIG. 3 is an enlarged, fragmentary, vertical, sectional view, part in elevation, showing the feed device of FIG. 1;

FIG. 4 is a fragmentary, vertical, sectional view, part in elevation, showing the coupling between the drive motor and the feed device;

FIG. 5 is an enlarged, fragmentary, horizontal, sectional view of the feed device of FIG. 1 showing the feed shaft and the operable connection thereof to the spindle;

FIG. 6 is an enlarged, vertical, sectional view taken on the broken lines 6—6 of FIG. 3;

FIG. 7 is an enlarged, fragmentary, vertical, sectional view, with certain parts broken away for clarity of illustration, taken on the broken lines 7—7 of FIG. 3; and FIG. 8 is an enlarged, fragmentary, horizontal, sectional view taken on the broken lines 8—8 of FIG. 3 and showing the feed device engaged.

Referring to the drawings, and particularly FIG. 1, the embodiment of the feed device of the present invention, generally indicated at 10, is shown axially coupled to a usual air drive motor, generally indicated at 12. In this case, the motor drive shaft 14, as shown in FIG. 4, extends coaxially with the main drive shaft 16 of the feed device and is coupled thereto in usual manner for the transmission of rotational movement therebetween. Furthermore, the air drive motor 12 is of usual form as before stated, and includes air coupling 18 providing air for rotating the motor drive shaft 14 and, in this case, the speed adjustment 20 for selectively adjusting the rotational speed of the motor drive shaft.

As shown in FIGS. 3 and 4, the housing 22 of the air drive motor 12 is secured to the housing 24 of the feed device 10 by means of a motor adapter 26 attached to the drive motor and telescopically receiving the end of the feed device housing 24. A lock screw 28 is threadably received in the motor adapter 26 and bears against a pair of keys 30 which are engaged with both the motor adapter and the feed device housing 24 so as to resist relative axial movement between the adapter and housing.

Alternate forms of positioning of the air drive motor 12 relative to the feed drive device 10 may be used and, as shown in FIG. 2, the drive motor 12 is positioned extending at right angles to the main portion of the feed device 10. In this case, usual forms of rotatable couplings may be provided, such as the bevel gears 32 operatively mounted interengaged on the motor drive shaft 14 and main drive shaft 16.

As shown in FIG. 3, the main drive shaft 16 of the feed device 10 extends substantially the length of the housing 24 and is rotatably mounted therein at the one end by the ball bearing 34 and at the other end by the needle bearing 36. Also, secured intermediate the length of the main drive shaft 16 is the main drive gear 38 and at the end of the drive shaft opposite from the drive motor 12 is secured the main worm gear 40. The drive worm wheel 42, having its main axis extending at right angles to that of the main drive shaft 16 is rotatably mounted in the housing 24 adjacent the main worm gear 40 and operably engaged therewith.

The drive worm wheel 42, in turn, axially slidably receives the combined unitary feed screw and spindle 44 with the spindle extending through and normally extending above and below the housing. Furthermore, rotatable splined drive is provided between the drive worm wheel 42 and the spindle 44 by means of a series of circumferentially spaced, axially extending slots 46 formed in the surface of the spindle 44 and axially slidably receiving a series of projections 48 formed internally of the drive worm wheel 42. Thus, the spindle 44 is free to move axially of the drive worm wheel 42, yet rotational drive therebetween is maintained at all times as can be best seen in FIG. 7.

A shift collar 50 is axially slidably received in the housing 24 spaced above the main drive shaft 16 and with the axis of this shift collar extending parallel to the axis of the main drive shaft. This shift collar 50 rotatably mounts the clutch shaft 52, with the pin 54 preventing rotation of the shift collar during rotation of this clutch shaft. A clutch gear 56 is secured to the clutch shaft 52 intermediate the length of this shaft and this clutch gear is interengaged with the main drive gear 38 of the main drive shaft 16 for the transmission of rotatable motion therebetween. It will be noted, as clearly shown in FIG. 3, that the clutch gear 56 is of greater axial length than the main drive gear 38 so that these gears may be maintained interengaged despite slight axial shifting of the clutch gear relative to the main drive gear.

A driving clutch plate 58 is secured to the left-hand end of the clutch shaft 52, as viewed in FIG. 3, and this driving clutch plate axially faces a driven clutch plate 60 mounted on the right-hand end of a coaxial feed shaft 62. Feed shaft 62 is likewise rotatably mounted in the housing 24 and extends from the driven clutch plate 60 at the one end to and radially adjacent the spindle 44.

Returning for the moment to shift collar 50 and clutch shaft 52, the shift collar at the right-hand end thereof, as viewed in FIGS. 3 and 5, mounts the shift pin 64 extending radially thereof and axially beyond the right-hand end of the clutch shaft 52. This shift pin 64 is, in turn, normally axially received in a radially extending, generally V-shaped cross section slot 65 formed in the shift cam 66. The shift cam 66 is mounted for limited rotation in the housing 24 coaxially of the shift collar 50 and clutch shaft 52, and this shift cam is urged in this limited rotational movement by the shift lever 68 which extends generally upwardly through the housing 24 through the slot 70.

Now, keeping in mind that the shift collar 50 may move axially but is prevented from rotation by the pin 54, as previously described, this requires that the shift collar will retain the shift pin 64 in the one radial position, as shown, so that when the cam slot 65 of the shift cam 66 is aligned with this shift pin 64, the shift pin may be received within this cam slot. When, however, the shift cam 66 is moved in its limited rotation relative to the shift collar 50 and, therefore, the shift pin 64, the shift cam forces the shift pin out of the cam slot 65 and, therefore, forces the shift collar 50 and clutch shaft 52 axially in the direction away from the shift cam. This, in turn, forces the driving clutch plate 58 axially toward the driven clutch plate 60.

The position of the shift cam 66 in which the shift pin 64 of the shift collar 50 is aligned with the cam slot 65 so that the pin is received within this slot is with the shift lever 68 extending substantially vertically, as shown in FIGS. 3 and 5, and in full lines in FIG. 6. This position of shift lever 68 is known as the "feed off" position, as will be hereinafter more fully explained. When, however, the shift lever 68 is moved in the housing slot 70 to the broken line position shown in FIG. 6, the shift pin 64 of the shift collar 50 is no longer aligned with the cam slot 65 of the shift cam 66 so that this pin is forced to ride up and out of the cam slot, thereby forcing the shift collar 50 and clutch shaft 52 axially to the left, as shown in FIGS. 3 and 5, which in turn forces the driving clutch plate 58 axially toward the driven clutch plate 60, as previously described. This position of the shift lever 68 is known as the "feed on" position and it will be noted that, due to the width of the clutch gear 56 relative to the main drive gear 38, this clutch gear can slide axially relative to the main drive gear while driving engagement is maintained therebetween.

The driving clutch plate 58 and driven clutch plate 60 are constructed for engagement and disengagement so as to form a usual ratchet type clutch which has rotative lock in one direction of rotation and complete disengagement and free rotation of the clutch plates in the opposite direction of rotation. The clutch plates 58 and 60 thereby form a usual manually engageable and disengageable clutch between clutch shaft 52 and feed shaft 62.

Thus, with the shift lever 68 in the "feed off" position placing the shift collar 50, clutch shaft 52 and driving clutch plate 58 in the right-hand shifted position, the various elements will be in the positions shown in FIGS. 3 and 5 in which the driving and driven clutch plates 58 and 60 are spaced apart and disengaged. When the shift lever 68 is moved to the "feed on" position, moving the shift collar 60, clutch shaft 52 and driving clutch plate 58 to the left-hand position, the driving and driven clutch plates 58 and 60 will be engaged and rotational drive will be established from the main drive gear 38 through clutch gear 56 to the clutch shaft 52 through the driving and driven clutch plates 58 and 60 and to the feed shaft 62, as shown in FIG. 8.

Feed worm gear 78 is mounted on the feed shaft 62 adjacent the spindle 44 for rotation with the feed shaft. Futhermore, the feed worm gear 78 is operably engaged with the feed nut or worm wheel 80 and the feed nut or worm wheel is, in turn, threadably engaged with the feed screw portion of the unitary food screw and spindle 44, as best seen in FIGS. 3, 5 and 7. Thus, rotation of the feed shaft 62 will transmit rotational drive through the feed worm gear 78 at right angles to the feed worm wheel 80, rotating this worm wheel and, due to the threadable engagement between the worm wheel and the spindle 44, relative rotation between the worm wheel and spindle in the one direction will feed the spindle downwardly, and in the other direction will retract the spindle upwardly, as shown in the drawings.

In the construction of the device shown, the feed worm gear 78 is constructed with an opposite directional thread pitch from the main worm gear 40 so that the drive of the feed shaft 62 and feed worm gear 78 in the counter-clockwise direction, as viewed from the left-hand end and indicated by the arrow 82 in FIG. 7, and rotation of the main drive shaft 16 and main worm gear 40 in the counter-clockwise direction, as indicated by the arrow 84 in FIG. 7, the feed worm wheel 80 and drive worm wheel 42 will be driven in the same rotational directions. Thus, in order for the threadable engagement between the feed worm wheel 80 and spindle 44 to produce downward feed movement of the spindle relative to the worm wheel, the feed worm wheel must rotate faster than the spindle and, therefore, faster than the drive worm wheel 42. Also, if the feed worm wheel 80 is stopped while the spindle 44 continues to rotate, the spindle will be retracted upwardly relative to the feed worm wheel. The rate of feed will be dependent on the combined factors of the increased speed of rotation of the feed worm wheel 80 over the spindle 44 and drive worm wheel 42, and the pitch of the spindle thread, while the rate of retraction will be dependent on the spindle speed alone and said spindle thread pitch, since the drive worm wheel is stationary.

For producing the end of the spindle feed stroke automatically, a feed stop collar 86 is mounted telescoped over the upper end of the spindle 44 and may be adjusted at a predetermined location dependent on the limit of feed desired for engaging the feed worm wheel 80 and stopping rotation of both the feed worm wheel and the spindle 44 by stalling the air drive motor 12, all of which will be hereinafter discussed. For manual retraction, it is merely necessary to manually move the shift lever 68 to the "feed off" position, thereby disengaging the clutch plates 58 and 60 to terminate rotative drive to the feed worm wheel 80. The feed worm wheel 80 will, therefore, remain stationary as a result of the frictional drag of the feed worm gear 78 and connected parts, and the reverse relative rotation between the feed worm wheel and the spindle 44 will cause retraction of the spindle, as hereinbefore described and to be more fully explained below.

In the particular embodiment shown, a drill 88 may be mounted in usual manner extending from the lower end of the spindle 44, as shown in FIGS. 1, 3 and 7. Also, an opening 90 may be provided through the housing 24, as shown in FIG. 5, for receiving various forms of supporting members in order to support the feed device positioned properly relative to a workpiece to be drilled.

In operation of the right angle positive feed device illustrated and incorporating the principles of the present invention, the air drive motor 12 is placed in operative position rotating the main drive shaft 16, and the desired speed of rotation of the drill 88 for the particular drilling operation to be performed is regulated by the speed adjustment 20 on the drive motor. At this point in the beginning, the shift lever 68 is in the "feed off" position and the feed stop collar 86 has been selectively adjusted axially relative to the spindle 44 for the desired depth or downward feed of the drill 88. Also, at this time, the spindle 44 is being rotatably driven by the main drive shaft 16 through the main worm gear 40 and drive worm wheel 42, while the driving clutch plate 58 and driven clutch plate 60 are spaced apart axially and disengaged, all as shown in FIGS. 3, 5 and 6.

To commence the downward feeding of the spindle 44 and, therefore, the drill 88, the shift lever 68 is moved to the "feed on" position, moving the shift collar 50, clutch shaft 52 and driving clutch plate 58 to the left, as viewed in FIGS. 3 and 5, causing engagement between the driving and driven clutch plates 58 and 60, as shown in FIG. 8. Engagement between these clutch plates 58 and 60 causes rotational drive to be transmitted from the main drive shaft 16 to the clutch shaft 52 and through the clutch plates to the feed shaft 62, thereby causing rotation of the feed worm gear 78 and feed worm wheel 80, which rotation of the feed worm wheel is faster than the rotation of the spindle 44.

The spindle 44 and drill 88 are, therefore, fed downwardly at a predetermined rate dependent on the factors hereinbefore discussed, while at the same time, constantly rotating and, referring to FIG. 7, this downward feeding continues until the feed stop collar 86 is moved downwardly and axially engages the feed worm wheel 80. At this point, the feed stop collar 86 locks with the feed worm wheel 80 and instantaneously stops rotation of this worm wheel and the rotation and axial feed of the spindle 44, causing the stalling out of the air driven motor 12. This condition will remain until the shift lever 68 is moved to its "feed off" position.

Thus, when the spindle 44 and drill 88 have reached the feeding depth determined by the collar 86 and stopped thereby, retraction is commenced merely by moving the shift lever 68 to its "feed off" position. This axially releases the shift collar 50, clutch shaft 52 and driving clutch plate 58 with the same moving to the right to disengage the driving clutch plate 58 from the driven clutch plate 60.

Disengagement of the driving clutch plate 58 from the driven clutch plate 60 breaks the attempted rotational drive or rotational urging to the feed shaft 62, and merely the usual resistance to rotation between the feed worm gear 78 and feed worm 80, as hereinbefore described, will be sufficient to retain the feed worm wheel stationary while the air drive motor 12 reinitiates rotation of the spindle 44, that is, the attempted rotational drive of the feed worm wheel has now been discontinued so that wtih the feed worm wheel remaining stationary, will produce reverse relative rotation between the spindle and feed worm wheel, even though the spindle rotates in the same direction of rotation. Thus, the rotation of the spindle 44 relative to the stationary feed worm wheel 80 will begin retraction of the spindle, the collar 86 and the drill 88 upwardly, since the air drive motor 12 is no longer stalled, and this retraction will continue to the desired point, at which time, the air drive motor 12 is again turn off.

In the event that the automatic stopping of the feed of the spindle 44 and drill 88 is not desired, the feed stop collar 86 is merely removed from the spindle. In such case, when the spindle 44 and drill 88 have reached the desired feeding depth, the shift lever 68 is manually moved to its "feed off" position, thereby beginning the retraction thereof in the same manner as hereinbefore described. Thus, the feeding depth of the spindle 44 and drill 88 may be stopped either automatically by the feed stop collar 86, or manually by shifting the lever 68 to its "feed off" position.

One of the novel features of the right angle positive feed device of the present invention is the provision of the spindle 44 as a unitary combined spindle and lead screw rotatably driven by the driven worm wheel 42 having a splined connection thereto, permitting axial or feeding movement of the spindle during the rotational drive thereof. At the same time, the axial feeding movement of the spindle 44 is produced by relative rotation between said spindle and the threadably connected feed worm wheel 80, both said feed worm wheel and the beforementioned drive worm wheel 42 being telescoped with the spindle and located axially adjacent one another, thereby providing an extremely compact unit, not possible with prior construction of the same general character.

Furthermore, the feed device of the present invention, while being of the positive feed type, provides for the choice of either automatic or manual stopping of the spindle feeding stroke, so that either may be used dependent on the particular conditions present. In addition, the device may be constructed for feeding the spindle 44, and, therefore, the tool in the form of the drill 88, at right angles to the main portion of the mechanism so as to provide convenience in mounting the device over the work and convenience in adjustment thereof. Still further, in view of the device being of positive drive and positive feed, all accomplished through direct gearing and clutch coupling to the power source, the device may be constructed for transmitting virtually any horsepower and torque.

I claim:

1. In a positive feed device of the type for feeding and retracting a tool to and from a workpiece, the combination of: a housing; a spindle mounted in said housing rotatable and axially movable in feeding and retracting strokes relative to said housing; drive means mounted on said housing spaced from said spindle; drive gear means operably connected between said drive means and spindle for constantly rotating said spindle in one direction during said spindle feeding and retracting strokes, said operable connection between said drive means and said gear means including a shaft rotatably mounted in said housing and connected for rotation by said drive means, said drive gear means including a worm wheel surrounding said spindle and a worm gear on said shaft and operably engaged with said worm wheel; feed gear means operably connected between said drive means and spindle providing relative rotation in one direction between said spindle and feed screw means driving said spindle axially in said feeding stroke while said spindle continues to rotate in said single direction, and providing relative rotation between said spindle and feed screw means in the opposite direction driving said spindle axially in said retracting stroke while said spindle continues to rotate in said single direction, said operable connection between said drive means and said feed screw means including a shaft operably connected to said drive means for rotation by said drive means at least during said spindle feeding stroke, said feed screw means including a worm wheel surrounding said spindle and operably engaged therewith for driving said spindle in said feeding stroke and worm gear means operably connected to said shaft and engaged with said worm wheel means; means actionable on said feed screw means for shifting the relative rotation between said spindle and feed screw means at the end of said feeding stroke between said one and opposite directions to begin said axial movement in said retracting stroke; and said spacing of said drive means on said housing from said spindle being in a direction at right angles to said axial movement of said spindle in said feeding and retracting strokes.

2. In a positive feed device of the type for feeding and retracting a tool to and from a workpiece, the combination of: a housing having a main drive shaft and a feed shaft rotatably mounted therein; a spindle mounted rotatable and axially movable in feeding and retracting strokes relative to said housing; said main drive and feed shafts being mounted in said housing with the axes thereof parallel and said axial movement of said spindle relative to said housing in said feeding and retracting strokes being at right angles to said axis of said main drive and feed shafts; drive means operably connected to said main drive shaft for rotating said main drive shaft; drive gear means operably connected between said main drive shaft and spindle for rotating said spindle in a single direction while permitting axial movement of said spindle in said feeding and retracting strokes, said drive gear means including a main worm gear on said main drive shaft operably engaged with a drive worm wheel on said spindle, said drive worm wheel on said spindle being rotatably engaged with said spindle while permitting relative axial movement of said spindle in relation to said drive worm wheel; feed gear means operably connected between said main drive and feed shafts for rotating said feed shaft; feed screw means operably connected between said feed shaft and spindle providing relative rotation in one direction between said spindle and feed screw means driving said spindle axially in said feeding stroke while said spindle continues to rotate in said single direction, and providing relative rotation between said spindle and feed screw means in the opposite direction driving said spindle axially in said retracting stroke while said spindle continues to rotate in said single direction, said operable engagement between said feed shaft and feed screw means including a feed worm gear; and means actionable on said feed screw means for shifting the relative rotation between said spindle and feed screw means at the end of said feeding stroke between said one and opposite directions to begin said axial movement in said retracting stroke.

3. In a positive feed device of the type for feeding and retracting a tool to and from a workpiece, the combination of: a housing having a main shaft and a feed shaft rotatably mounted therein, said main drive and feed shafts being positioned rotatable about parallel axes; a spindle mounted rotatable and axially movable in feeding and retracting strokes relative to said housing, said spindle being positioned rotatable about an axis at a right angle relative to said shaft axes; drive means operably connected to said main drive shaft for constantly rotating said main drive shaft during said spindle feeding and retracting strokes; drive gear means operably connected between said main drive shaft and spindle for constantly rotating said spindle in a single direction during said feeding and retracting strokes while permitting axial movement of said spindle in said feeding and retracting strokes; feed gear means operably connected between said main drive and feed shafts for rotating said feed shaft; feed screw means operably connected between said feed shaft and spindle including a feed screw on the coaxial with said spindle rotatably and axially movable therewith and a rotatable feed screw nut operably engaged with said feed screw, said feed screw nut being rotatable at a faster speed than said feed screw driving said feed screw and spindle axially in said feeding stroke, said feed screw nut driving said feed screw and spindle axially in said retraction stroke when stationary; and means operably associated with said feed shaft and said feed screw nut for rotating said feed screw nut by said feed shaft at said faster speed during said feeding stroke and for stopping rotation of said feed screw nut during said retracting stroke.

4. A positive feed device as defined in claim 3 in which said feed screw nut rotation is in the same direction and faster than the rotation of said feed screw and spindle during said feeding stroke; and in which said means operably associated with said feed shaft and said feed screw nut for rotating said feed screw nut includes clutch means between said feed gear means and said feed shaft engaged for rotating said feed shaft and feed screw nut during said spindle feeding stroke and disengaged during said spindle retracting stroke, and means for engaging and disengaging said clutch means.

5. A positive feed device as defined in claim 3 in which a stop collar is mounted on said spindle and feed screw positioned for stopping axial feeding movement of said spindle and feed screw at the end of said feeding stroke and retaining said spindle and feed screw stationary until said means operably associated with said feed shaft and said feed screw nut has been actuated for stopping rotation of said feed screw nut during said retraction stroke.

6. A positive feed device as defined in claim 3 in which said feed screw nut rotation is in the same direction and faster than the rotation of said feed screw and spindle during said feeding stroke; and in which said means operably associated with said feed shaft and said feed screw nut for rotating said feed screw nut includes clutch means between said feed gear means and said feed shaft engaged for rotating said feed shaft and feed screw nut during said spindle feeding stroke and disengaged during said spindle retracting stroke, and means for engaging and disengaging said clutch means including a manually operable shift lever operably connected to said clutch means selectively movable to a feed on position engaging said clutch means and selectively movable to a feed off position disengaging said clutch means.

7. In a positive feed device of the type for feeding and retracting a tool to and from a workpiece, the combination of: a housing; a combined feed screw and spindle rotatably mounted in said housing and axially movable relative to said housing in feeding and retracting strokes; drive means for rotatably driving said feed screw and spindle and driving said feed screw and spindle axially in said feeding and retracting strokes; drive gear means operably connected between said drive means and said feed screw and spindle for rotating said spindle in a single direction throughout and while permitting axial movement of said feed screw and spindle in said feeding and retracting strokes; feed screw nut means operably connected between said drive means and feed screw threadably engaged with said feed screw, said operable connection between said drive means and feed screw nut means including power transmission means shiftable to a first position rotating said feed screw nut means by said drive means at a speed greater than said rotation of said feed screw and spindle during said feeding stroke and shiftable to a second position free of transmitting said rotatable drive between said drive means and said feed screw nut means stopping rotation of said feed screw nut means during said retracting stroke, said feed screw nut means driving said feed screw and spindle axially in said feeding stroke during rotation of said feed screw nut means and driving said feed screw and spindle in said retracting stroke when said feed screw nut means is stopped; and means actionable upon said power transmission means for shifting said power transmission means between said first and second positions.

8. A positive feed device as defined in claim 7 in which stop means is mounted on said feed screw and spindle engageable with said feed screw nut means at the end of said feeding stroke for stopping rotation of said feed screw and spindle and said feed screw nut means until said power transmission means has been shifted from said first to said second position; and in which said power transmission means includes clutch means between said drive means and said feed screw nut means engaged for rotating said feed screw nut means when said power transmission means is in its first position and disengaged free of rotating said feed screw nut means when said power transmission means is in its second position.

9. A positive feed device as defined in claim 7 in which said power transmission means includes clutch means between said drive means and said feed screw nut means engaged for rotating said feed screw nut means relative to said feed screw and spindle when said power transmission means is in said first position and disengaged free of rotating said feed screw nut means when said power transmission means is said second position; and in which said means actionable on said power transmission means includes a manually operable shift lever operably connected to said clutch means selectively movable to a feed on position engaging said clutch means and selectively movable to a feed off position disengaging said clutch means.

10. In a positive feed device of the type for feeding and retracting a tool to and from a workpiece, the combination of: a housing; a combined feed screw and spindle rotatably mounted in said housing and axially movable relatively to said housing in feeding and retracting strokes; drive means for rotatably driving said feed screw and spindle and driving said feed screw and spindle axially in said feeding and retracting strokes; drive gear means telescoped over said spindle for rotating said feed screw and spindle in a same single direction during and throughout said feeding and retracting strokes; feed screw nut means telescoped over and threadably engaged with said feed screw for driving said feed screw and spindle axially in said feeding stroke upon said feed screw nut means being rotated at a faster speed in said single direction than said feed screw and spindle, and for driving said feed screw and spindle axially in said retracting stroke upon said feed screw nut means being stationary and substantially free of rotation; and power transmission means operably connected between said drive means and said drive gear means and said feed screw nut means for rotation of said drive gear means and feed screw nut means by said drive means, said power transmission means including clutch means actionable for completing rotatable drive to said feed screw nut means during said feeding stroke and interrupting rotatable drive to said feed screw nut means during said retracting stroke, said power transmission means including worm gear means between said clutch means and said feed screw nut means for transmitting said rotatable drive to said feed screw nut means during said feeding stroke and at least aiding in retaining said feed screw nut means stationary during said retracting stroke.

11. A positive feed device as defined in claim 10 in which said drive gear means is rotatably mounted axially stationary in said housing and spline connected to said feed screw and spindle.

12. A positive feed device as defined in claim 10 in which said drive gear means is rotatably mounted axially stationary in said housing and spline connected to said feed screw and spindle; and in which said feed screw nut means is rotatably mounted axially stationary in said housing axially adjacent said drive gear means.

13. A positive feed device as defined in claim 10 in which a manually operable shift lever is operably connected to said clutch means of said power transmission means selectively movable to a feed on position actuating said clutch means to complete said rotatable drive and selectively movable to a feed off position actuating said clutch means to interrupt said rotatable drive.

References Cited

UNITED STATES PATENTS

| | | | |
|---|---|---|---|
| 150,990 | 5/1874 | Tufford | 77—34.4 |
| 234,603 | 11/1880 | Naish | 77—34.4 |
| 613,748 | 11/1898 | Wilson | 77—34.4 |
| 1,453,732 | 5/1923 | Stevens | 77—34.5 |
| 2,566,084 | 8/1951 | Esseling | 77—34.4 |

FRANCIS S. HUSAR, *Primary Examiner.*

U.S. Cl. X.R.

10—136; 144—106; 77—7, 33.3